United States Patent
Atkinson

[19]

[11] Patent Number: 5,884,049
[45] Date of Patent: Mar. 16, 1999

[54] INCREASED PROCESSOR PERFORMANCE COMPARABLE TO A DESKTOP COMPUTER FROM A DOCKED PORTABLE COMPUTER

[75] Inventor: Lee W. Atkinson, Houston, Tex.

[73] Assignee: Compaq Computer Corporation, Houston, Tex.

[21] Appl. No.: 774,806

[22] Filed: Dec. 31, 1996

[51] Int. Cl.⁶ .............................. G06F 13/00; G06F 1/20; H05K 7/20
[52] U.S. Cl. ...................... 395/281; 395/750.01; 361/687
[58] Field of Search ............... 395/281, 750.01, 395/750.08; 361/686, 687; 364/708.1

[56] References Cited

U.S. PATENT DOCUMENTS

| | | | |
|---|---|---|---|
| 5,394,552 | 2/1995 | Shirota | 395/750.05 |
| 5,450,271 | 9/1995 | Fukashima et al. | 361/686 |
| 5,463,742 | 10/1995 | Kobayashi | 395/281 |
| 5,537,343 | 7/1996 | Kikinis et al. | 364/708.1 |
| 5,642,517 | 6/1997 | Shirota | 395/750.08 |
| 5,652,891 | 7/1997 | Kitamura et al. | 395/750.06 |
| 5,664,118 | 9/1997 | Nishigaki et al. | 395/283 |
| 5,673,173 | 9/1997 | Tsai | 361/686 |
| 5,694,292 | 12/1997 | Paulsel et al. | 361/686 |
| 5,721,836 | 2/1998 | Scharnberg et al. | 395/281 |
| 5,721,837 | 2/1998 | Kikinis et al. | 395/281 |
| 5,745,375 | 4/1998 | Reinhardt et al. | 364/528.21 |
| 5,768,101 | 6/1998 | Cheng | 361/687 |

*Primary Examiner*—Gopal C. Ray
*Attorney, Agent, or Firm*—Pravel, Hewitt & Kimball

[57] ABSTRACT

A portable computer is provided with comparable performance to a desktop computer when docked at a docking station. When the portable computer is docked or physically coupled to the docking station, the microprocessor of the portable computer switches to an increased operating frequency. The onboard power supply of the portable computer is also disabled on docking, and the portable computer receives power from the docking station. Increased heat transfer capability is also enabled in the portable computer when it is docked, providing increased cooling to the portable computer. The portable computer thus overcomes the normal performance disparity between a portable computer system and a desktop computer system when the portable computer is docked.

27 Claims, 4 Drawing Sheets

INCREASED PROCESSOR PERFORMANCE COMPARABLE TO A DESKTOP COMPUTER FROM A DOCKED PORTABLE COMPUTER

BACKGROUND OF THE INVENTION

1. Field of the Invention

The present invention relates to increasing the performance of docked portable computers to comparable levels with desktop computers.

2. Description of the Related Art

Design choices of a portable computer have become particularly challenging. In the past, portable or laptop computers have for reasons of weight and power consumption limitations typically performed at levels somewhat lower than desktop computers. It would, of course, be desirable for a portable computer to provide functionality, connectivity, and performance substantially similar or comparable to that of a desktop unit. Comparability or equivalency of a portable computer and a desktop unit in functionality, connectivity, and performance is termed desktop parametric equivalency (DPE). Docking stations which are also termed convenience bases have enabled desktop equivalence for laptop computers in functionality and connectivity. A docking station is a non-portable unit that typically operates from AC power and resides on a user's desktop. These bases allow for various port and adaptor connections such as keyboard, parallel, serial, and VGA (video graphics adaptor) connections. In terms of functionality, docking stations offer expansion via standardized I/O (input/output) buses, network controllers, and additional peripheral devices.

While docking stations have resolved the issue of equivalency in functionality and connectivity, docking stations have not been able to provide comparability of portable computer performance with desktop models. The performance of the docked laptop set has, so far as is known, been a generation behind the desktop set due to the different thermal and power requirements of a laptop set. For a portable computer, thermal dissipation and power supply capacity have been budgeted around the available processor performance for portable computers, so that a processor can work at its maximum capacity while operating on a stand-alone basis.

Improved processor performance as a function of processor speed is typically achieved, through higher processor frequencies. These frequencies may be provided internally or externally to the processor. As the semiconductor technology used predominantly in computers is CMOS (Complementary Metal Oxide Substrate) logic, the processor frequencies are associated with the power consumption of the CMOS logic. Achieving these higher frequencies for a portable computer has thus required higher core voltages used by the CMOS logic. The size of a portable computer power supply is proportional to its required voltage output. Higher core voltages for increased performance thus require a substantial increase in power supply size. An increase in power supply size compromised a mobile users need for small size and low weight from a portable computer. Therefore, the size of the portable computer has been a constraint upon improvements in processor speed.

Thermal requirements have also prevented improved processor performance for portable computers. Power usage in a portable computer is proportional to the square of the core voltages used by the CMOS logic, and also directly proportional to the frequency of the CMOS current. The higher voltages and frequencies necessary for improved processor performance caused significant amounts of additional heat within the portable computer. High temperatures in a portable computer affected the reliability of processor components, and also created undesirable heat concentrations or hot spots on the portable unit. An increase in processor performance thus would have typically required additional space in the computer for active or passive cooling of the processor. The increase in computer system size to accommodate this additional space would increase the size and weight of the portable computer, a factor contrary to the needs of laptop computer users.

Docking stations, as far as is known, have not aided the portable computer in overcoming weight and size requirements imposed by thermal dissipation and power supply capacity. These weight and size requirements have thus imposed a performance disparity between the docked portable computer and a desktop set. Desktop performance equivalency would, of course, be desirable for a docked portable computer, but so far as is known the power and size increases necessary for performance comparability have been significant deterrents.

SUMMARY OF THE INVENTION

Briefly, a portable computer and docking station according to the present invention increases performance comparability without requiring increased power usage of the desktop computer when docked. The portable computer of the present invention is adapted to sense docking and receive power from an AC/DC converter provided by the docking station. Also, the portable computer when docked is capable of multi-voltage and multi-frequency CMOS operations. Thus an additional core voltage is supplied by the docking station or by a programmable DC/DC converter in the portable computer. The present invention also provides a heat transfer mechanism for cooling the portable computer. The heat generated by the onboard power supply of the portable computer is in effect removed by using power transferred from the docking stations. Also, external cooling is provided to the docked portable computer. The present invention thus allows the processor to run at a faster speed comparable or equivalent to the speed associated with a desktop set. Thus, the docked portable computer of the present invention allows for desktop equivalent performance.

When the portable computer is docked to the docking station, a dock presence signal is asserted by a docking sensor and a higher core voltage for operation of the portable computer is enabled. The dock presence signal may be used to switch a bus frequency divider internal to the processor which controls the frequency of the phase lock loop oscillator in the processor. Alternatively, the dock presence signal switches the clock modulation level of the processor between run and stop modes using clock throttle emulation. Either technique results in an effectively faster processor speed. In another mode, the dock presence signal causes a switch between two external oscillators having different frequencies. The higher core voltage for increased portable computer capabilities may be supplied by the docking station, or alternatively may be supplied by the DC/DC converter in the portable computer programmed by the dock presence signal.

To isolate a user from any hot spots on the portable computer and to prevent processor component failures due to the higher core voltages and frequencies, cooling is supplied to the portable computer by the docking station. This cooling may take a number of alternative forms: an air conduit between the docking station and the portable computer which forces air from a fan into the laptop, a mechanical heat or temperature sink connection between the portable computer and the docking station to draw heat away from the laptop, or a fluid connection which circulates a cooling fluid such as freon into the laptop.

BRIEF DESCRIPTION OF THE DRAWINGS

The present invention may be readily described and understood by reference to the accompanying drawings in which.

DETAILED DESCRIPTION OF THE PREFERRED EMBODIMENT

Figure 1:
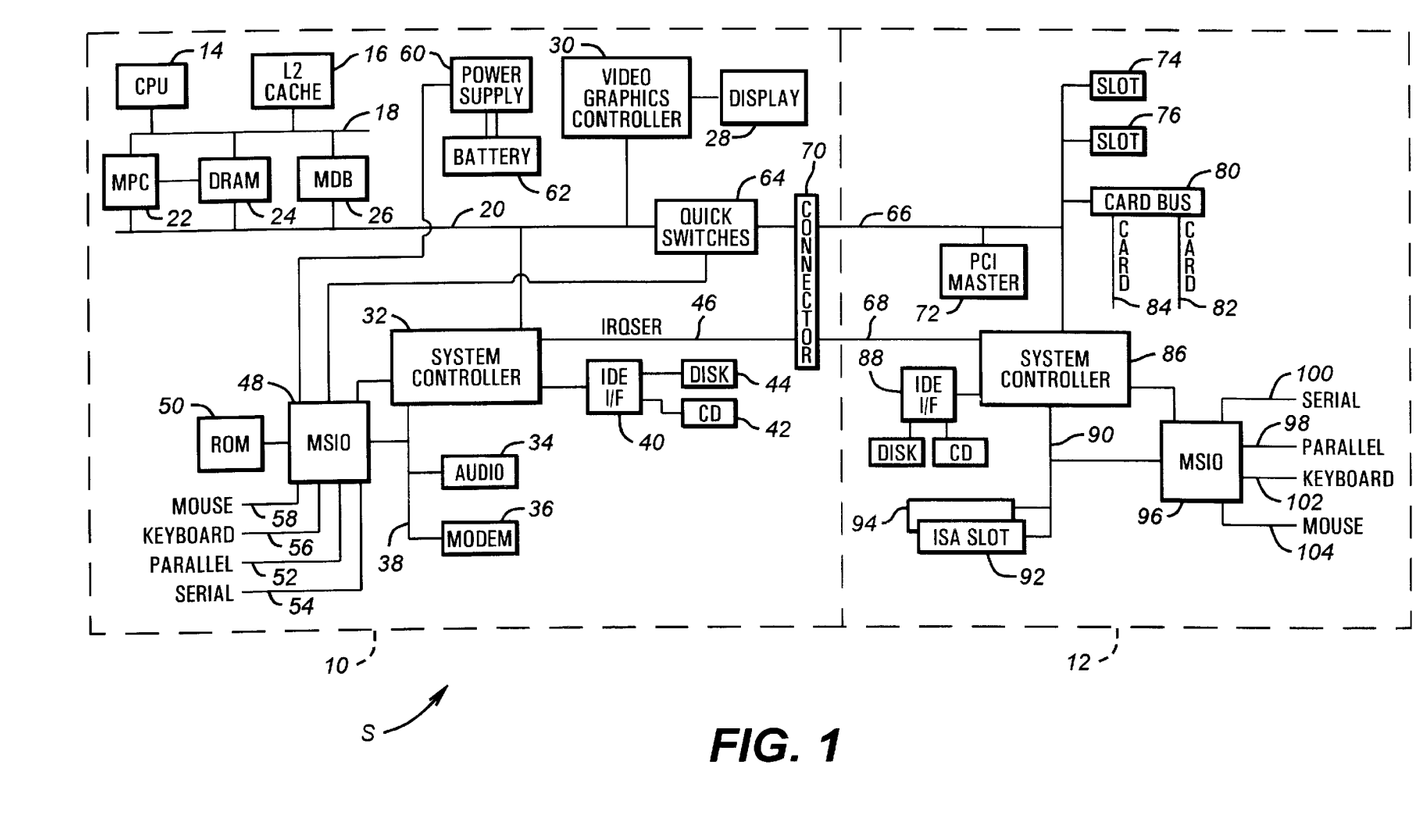
FIG. 1 is a schematic diagram of a computer system having a portable computer and a docking station of the present invention.

Referring now to FIG. 1, a computer system S according to the present invention is shown. In FIG. 1 the system includes a portable computer 10 and a docking station 12. Within the portable computer 10, a CPU 14 and level 2 (L2) cache 16 are connected to a high speed local bus 18. The processor 14 of the preferred embodiment is one of the 80X86 microprocessor family manufactured by Intel Corporation of Santa Clara, Calif. In the preferred embodiment, the processor 14 operates with a standard IBM-PC compatible operating system, such as MS-DOS or Windows, available from Microsoft Corporation of Redmond, Wash. The L2 cache 16 provides additional caching capabilities to the processor's on-chip cache to improve performance.

In addition to the CPU 14 and cache 16, a number of memory interface and memory devices are connected between the local bus 18 and a PCI bus 20. These devices include a memory to PCI cache controller (MPC) 22, a dynamic random access memory (DRAM) array 24, and a memory data buffer (MDB) 26. The MPC 22 is connected to the DRAM array 24, which is further connected to the MDB 26. The MPC 22, DRAM array 24, and MDB 26 collectively form a high performance memory system for the computer system. Also, a display 28 is connected to a video graphics controller 30 which is further connected to the PCI bus 20.

The PCI bus 20 is also connected to a system controller 32. The system controller 32 is a PCI to ISA bus bridge which provides various support functions distributed between the portable computer and the docking station of the system. Preferably the system controller 32 is a single integrated circuit that acts as a PCI bus master and slave, an ISA bus controller, and ISA write posting buffer, an ISA bus arbiter, DMA devices, and an IDE disk interface 40. The system controller 32 is connected to an audio board 34 and a modem 36 as conventionally present in PC systems to provide sound and data communication capabilities for the system via a first ISA interface 38. The IDE interface 40 of the system controller drives one or more hard disk drives, preferably a CD-ROM player 42 and a disk drive 44. Further, the system controller 32 provides a single pin output to support an interrupt serial bus (IRQSER) 46.

The system controller 32 is connected to an MSIO (mobile super I/O) chip 48. The MSIO 48 is connected to a ROM (read-only-memory) 50. The ROM 50 receives its control, address and data signals from the MSIO 48. Preferably, the ROM 50 contains the BIOS information for the computer system S and can be reprogrammed to allow for revisions of the BIOS. Additionally, the MSIO 48 provides a parallel port 52, a serial port 54, a keyboard interface 56 and mouse interface 58, among others, for the computer system S. MSIO 48 is further connected to a power supply 60 which is connected to a battery 62.

A plurality of Quick Connect switches 64 are also connected to the PCI bus 20. Upon detecting a docking sequence between the portable computer 10 and the docking station 12, the Quick Connect switches 64 couple the PCI bus 20 and the IRQSER bus 46 to an expansion PCI bus 66 and an expansion IRQSER bus 68 on the docking station 12 with a connector 70. The Quick Connect switches 64 are a series in-line FET transistors having low $r_{ds}$, or turn-on resistance, values to minimize the loading on the PCI buses 20 and 66 and the IRQSER buses 46 and 68.

Turning now to the docking station 12, one or more PCI masters 72 are connected on the expansion PCI bus 66, which is adapted to be connected to the PCI bus 20 over the Quick Switches 64 when the portable computer 10 is docked to the docking station 12. The PCI bus 66 is also connected to PCI slots 74 and 76 and also to a card-bus interface 80 for accepting expansion cards 82 and 84. Also connected to the expansion PCI bus 66 is a second system controller 86, which is preferably a second integrated circuit of the same type as the system controller 32. The system controller 86 is connected to the expansion PCI bus 66 and the interrupt serial bus 68. The controller 86 supports additional drives through a second IDE interface 88. The system controller 86 also supports an ISA bus 90 which is connected to one or more ISA slots 92 and 94. The system controller 86 is further connected to a second MSIO device 96, which provides a secondary parallel port 98, serial port 100, keyboard interface 102 and mouse interface 104.

Thus, the system S, upon docking, may have multiple parallel ports, serial ports, keyboards, mice, and disk drives via the system controllers 32 and 86. Additionally, the system S may have a plurality of PCI and ISA type peripherals on their respective buses. The availability of a plurality of slots allows more peripherals to be connected to the system S and contributes to the useability and flexibility of the portable computer 10 when it is docked to the docking station 12.

The plurality of IDE interfaces 40 and 88 on system controllers 32 and 86 provide the capability to expand the data storage capability of the system S. The IDE interfaces 40 and 88 require a mechanism for mapping drives configured in the master-master configuration into a master-slave configuration when the portable computer 10 is docked to the docking station 12 for BIOS compatibility purposes and which remaps the drives back into a master-master mode after the separation of the portable computer 10 from the docking station 12 to ensure optimal performance.

Figure 2:
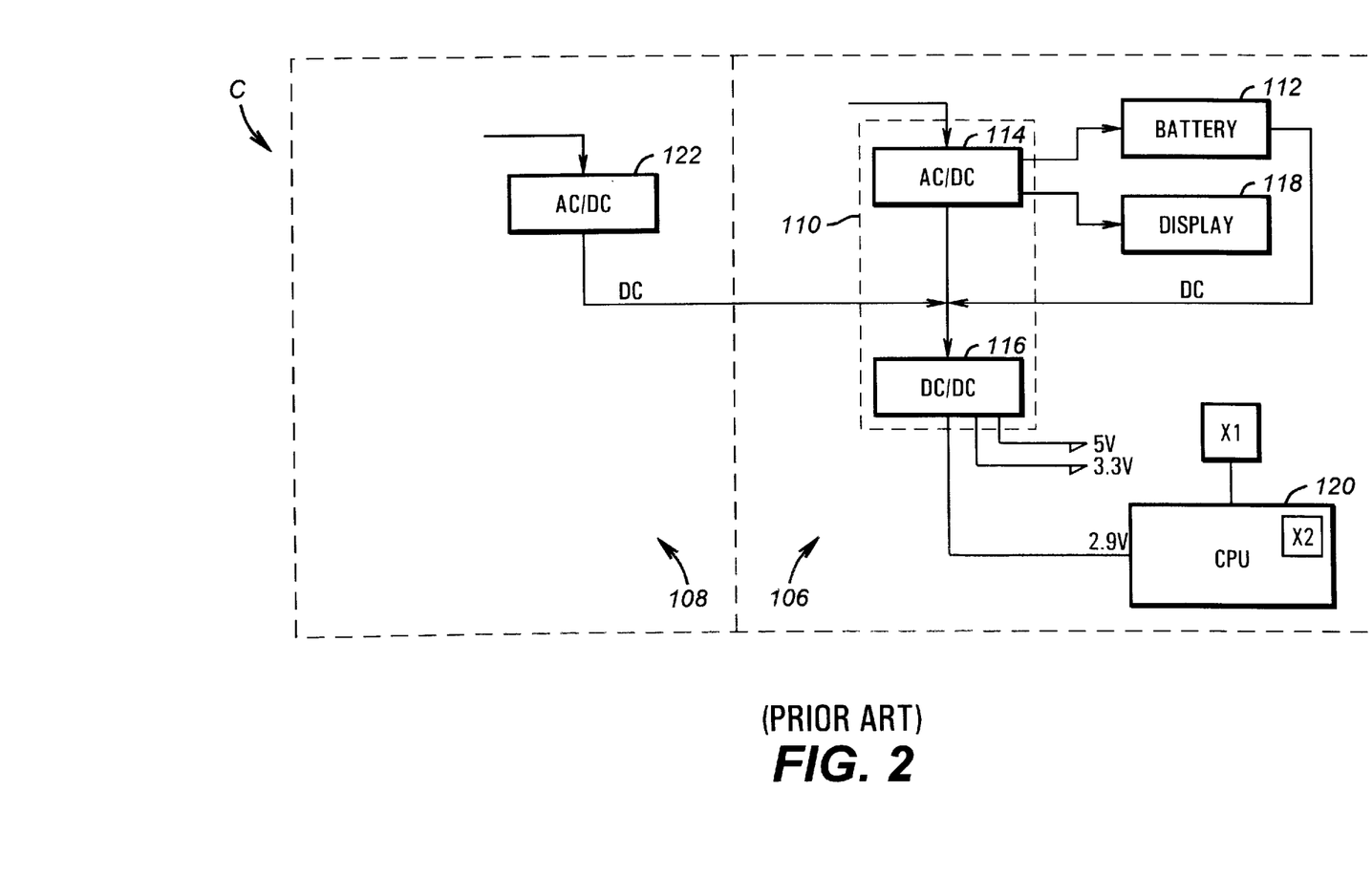
FIG. 2 is a schematic diagram of the power structure of a prior art computer system having a portable computer and a docking station.

Turning now to FIG. 2, a schematic diagram of the power structure of a computer system C having a portable computer 106 and a docking station 108 according to prior art techniques is shown. In such a prior art power structure, a portable computer 106 includes a power supply 110 and a battery 112. The power supply 110 includes an AC/DC converter 114 and a DC/DC converter 116. When the portable computer 106 is stand-alone, its power source may be the battery 112 or a wall outlet. If the power source is the battery 112, the battery 112 provides a DC voltage to the DC/DC converter 116.

The AC/DC converter 114 is used whenever the power source of the portable computer 106 is a wall outlet. The AC/DC converter 114 receives an input typically ranging from about 110 volts alternating current (110 VAC) to about 240 volts alternating current (240 VAC), and converts it to a primary direct current (DC) voltage of about 8 to 18 volts DC. When the power source of the portable computer 106 is a wall outlet, the DC current output from the AC/DC converter 114 of the portable computer 106 is used to charge the laptop battery 112, to serve as a power source to the DC/DC converter 116, and to further serve as power source to the display 118. The total power output of such an AC/DC converter 114 is typically between 35 and 40 watts. Since the efficiency of an AC/DC converter is typically about 85%, the AC/DC converter 114 generates about excess six watts in heat which must be dissipated. Since the AC/DC converter 114 is contained in the portable computer 106, the excess heat resulting from inefficiency represents power that the CPU 120 cannot dissipate.

The portable computer 106 requires multiple source voltages for operation of its various components which are outputted by its DC/DC converter 116. These output voltages are typically 5 volts, 3.3 volts, and 2.9 volts. The 2.9 volts is typically provided to the CPU 120 for its operation, and therefore is referred to as the core voltage. The 5 volts and 3.3 volts are used by other CMOS logic in the portable computer 106. The total output of the DC/DC converter 116 is typically about 20 watts.

A conventional prior art docking station 108 typically includes an AC/DC converter 122 which provides a single DC voltage output for a source voltage to the portable computer 106 when the portable computer 106 is docked to the docking station 108. The AC/DC converter 122 is used whenever the power source of the docking station 108 is a wall outlet. In the power structure of the computer system C, prior art docking stations have essentially replaced the battery 112 as a power source for the portable computer 106 when docked.

The CPU 120 of the portable computer 106 utilizes a core voltage provided by the DC/DC converter 116 to operate at a particular clock frequency. The CPU 120 may be clocked at a frequency either externally at a nominal frequency X1 or internally at twice nominal frequency, or X2. Some contemporary CPUs allow for dynamic changing of core voltages and the associated frequencies. Due to the weight and size limitations of a portable computer, the high voltages and high frequencies on the order of voltages and frequencies associated with a desktop computer would require heat dissipation and a proportionally bigger power supply 110, compromising the needs of mobile users. With the present invention, this capability of such processors is used in connection with a docking station to achieve even higher voltages and frequencies for a CPU.

Figure 3:
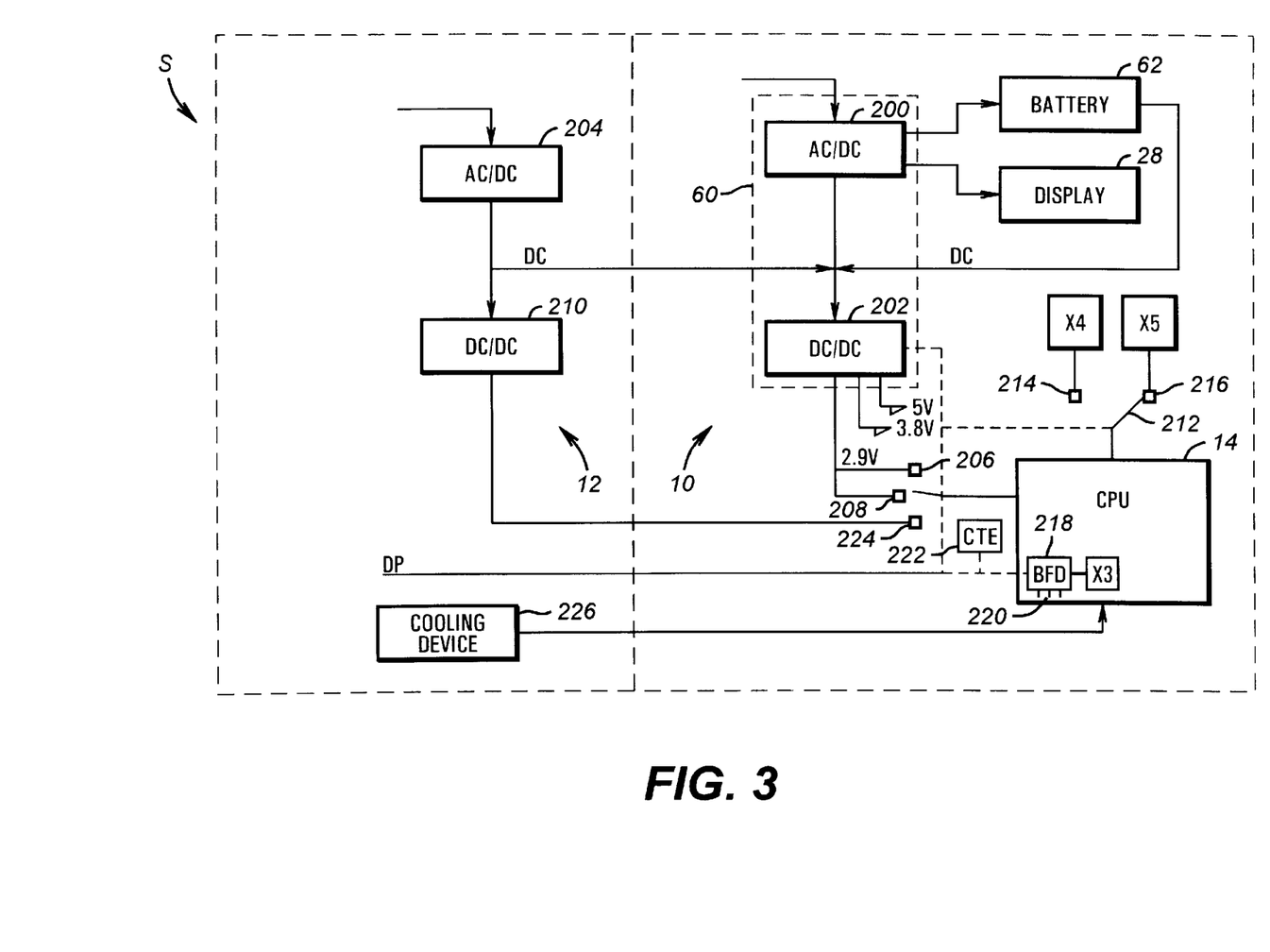
FIG. 3 is a schematic diagram of the power structure of the computer system of FIG. 1.

Turning to FIG. 3, a power structure of the computer system S of the present invention is shown. The computer system S includes the portable computer 10 and the docking station 12. The portable computer 10 may be any of a variety of mobile computers capable of connecting to a docking station or expansion unit, such as luggables and notebooks. The portable computer 10 includes the battery 62 and display 28, also shown in FIG. 1, which function in like manner to battery 112 and display 118 in the prior art portable computer 106 of FIG. 2. The portable computer 10 further includes an AC/DC converter 200 and a DC/DC converter 202.

The operation of the AC/DC converter 200 in the portable computer 10 depends upon whether or not the portable computer 10 is docked to a docking station 12. When the portable computer 10 is not docked, the AC/DC converter 200 provides a DC voltage to the DC/DC converter 202 of the portable computer 10. However, when the portable computer 10 is docked to a docking station 12, the DC voltage provided to the DC/DC converter 202 is instead supplied by an AC/DC converter 204 of the docking station 12.

An AC/DC converter 200 of a portable computer 10 generates a substantial amount of heat. The present invention, as noted above, supplies the DC voltage to the DC/DC converter 202 of the portable computer 10 from a source external to the portable computer 10 when the portable computer 10 is docked at a docking station 12. Thus, heat associated with normal operation of the onboard AD/DC converter 200 is not generated. This power generation and its attendant heat are in effect relocated outside the portable computer 10 and transferred to the docking station 12. Transferring heat outside the thermal managed zone of the portable computer 10 allows the CPU 14 to be run at a faster speed. The heat resulting from increased performance of the CPU 14 is no longer excess, since no heat is present from converter 200.

Also, when the portable computer 10 is not docked, the DC/DC converter 202 of the portable computer provides the core voltage to the CPU 14 at node 206. However, when the portable computer 10 is docked to a docking station 12, a higher core voltage is supplied. The DC/DC converter 210 of the docking station 12 may provide an increased core voltage at node 208 because converter 202 may be disabled on docking.

The DC/DC converter 202 of the portable computer 10 can be programmed to switch to a higher voltage when the portable computer 10 is docked to a docking station 12. For example, the DC/DC converter 202 may be programmed by a dock presence signal DP which can be formed by an electrical or mechanical sensor switch, activated when a proper docked and aligned condition is achieved. The dock presence signal DP may thus be formed by being taken to electrical ground when proper docking is achieved. The dock presence signal DP is thus asserted when the portable computer 10 is properly docked to the docking station 12 and is deasserted when the portable computer 10 is not properly docked. Thus, assertion of the dock presence signal DP switches the DC/DC converter 202 from a lower core voltage at node 206 to a higher core voltage at node 208, while deassertion of the dock presence signal DP switches the converter 202 from a higher core voltage at node 208 to a lower core voltage at node 206.

The dock presence signal DP may also be used to control the speed of the CPU 14. The present invention contemplates a variety of embodiments for using the dock presence signal DP to control the CPU's speed. In one embodiment, the dock presence signal DP is coupled to a switch 212 which switches between two oscillators X4 and X5 external to the CPU 14. When the dock presence signal DP is asserted, the switch 212 switches from the oscillator X4 generating the lower frequency at node 214 to the oscillator X5 generating the higher frequency at node 216. When the dock presence signal DP is deasserted, the switch 212 switches from the oscillator X5 generating the higher frequency at node 216 to the oscillator X4 generating the lower frequency at node 214.

A second alternative for CPU clock frequency adjustment or docking is to couple the dock presence signal DP to a bus frequency divider 218 that controls the frequency of an internal oscillator X3. When the dock presence signal DP is deasserted, the bus frequency divider 218 provides a standard bus frequency. However, when the dock presence signal DP is asserted, the bus frequency divider 218 multiplies the standard bus frequency by a value set by the bus frequency pins 220, producing a higher frequency.

Another technique for controlling the speed or clock frequency of the CPU 14 is use of the dock presence signal DP to change the clock modulation level of the CPU 14 using clock throttle emulation. A clock throttle emulator 222 does not rely on actually changing the frequency of the CPU. Instead, the emulator 222 pulse-width modulates the CPU 14 into "run" and "stop" modes. An advantage in using clock throttle emulation is that it does not change the voltage requirements for a CPU 14.

Figure 4:
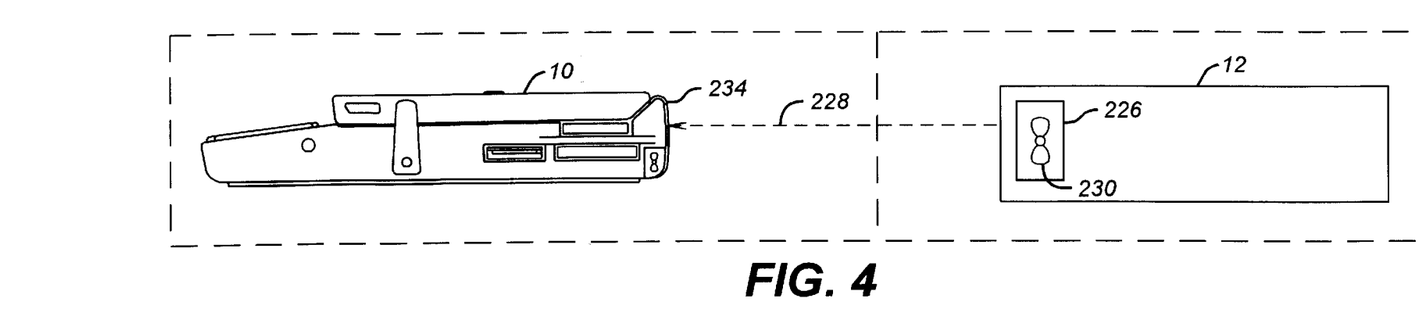
FIG. 4 is a diagrammatic side view of the air conduit embodiment of the cooling device of the computer system of FIG. 3.

Since the docked heat for the portable computer 10 can be significantly greater than its undocked heat, the portable computer 10 of the present invention is preferably cooled by a heat transfer mechanism or cooling device 226 in the docking station 12. Contemporary docking stations have not included cooling devices for docked portable computers. The cooling device 226 has three possible embodiments shown in FIG. 4, FIG. 5, and FIG. 6. Turning to FIG. 4, one embodiment is an air conduit 228 between the docking station 12 and the portable computer 10 through which a fan 230 forces air into the portable computer 10. The air serves to cool the CPU 14 which operates at a higher core voltage when the portable computer 10 is docked. The cooling reduces any hot spots on the portable computer 10 and also allows the CPU 14 and other electronic components to operate more reliably at lower temperatures. Further, the cooling device 226 assists the docked portable computer 10 of the present invention in overcoming the heat resulting from power requirements that would otherwise limit contemporary portable computers 106.

Figure 5:
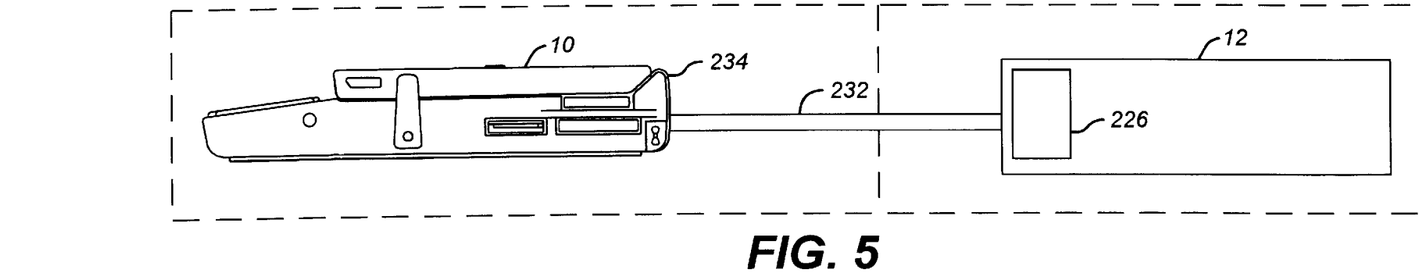
FIG. 5 is a diagrammatic side view of the heat sink embodiment of the cooling device of the computer system of FIG. 3.

Referring to FIG. 5, another embodiment of the heat transfer mechanism or cooling device 226 is a mechanical connection between the portable computer 10 and the docking station 12. The docking station 12 acts as a heat sink by drawing heat away from the portable computer 10. Unlike the air conduit embodiment described above, the heat sink embodiment does not require noise generated by a fan for causing flow of cooling air. An example of a mechanical connection for a heat sink embodiment is a heat pipe 232. Preferably the cooling device 226 of either embodiment cooperates with a trapped door 234 that is opened when the portable computer is docked in the docking station 12 but, is closed otherwise. This is done to reduce the likelihood of user contact with any hot spots on the portable computer 10.

Figure 6:
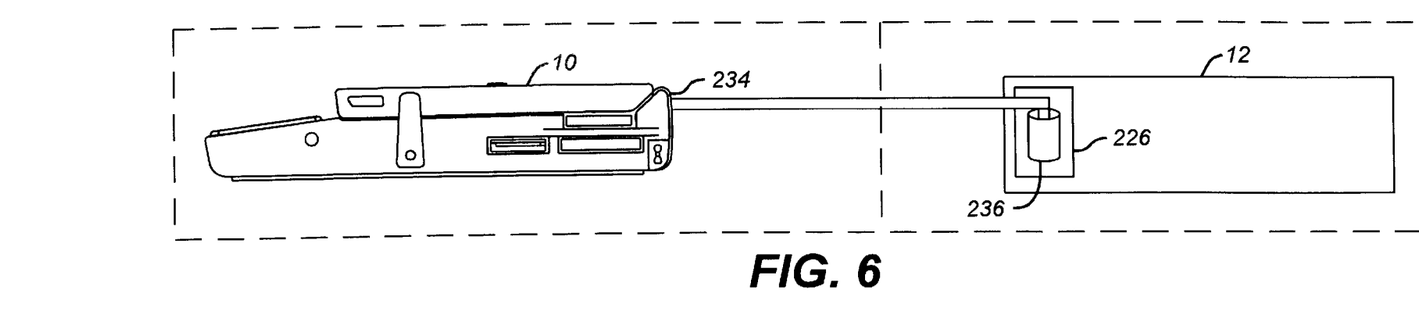
FIG. 6 is a diagrammatic side view of the fluid pump embodiment of the cooling device of the computer system of FIG. 3.

Referring to FIG. 6, a third embodiment is a pump or compressor 236 which pumps fluid such as a refrigerant into the portable computer 10 for circulation through it in conduits to extract heat.

Thus, the present invention provides a docking station 12 having an AC/DC converter 204, a DC/DC converter 210 and a heat transfer mechanism or cooling device 226 for allowing the CPU 14 of the portable computer 10 to operate at a higher speed. While weight and size requirements limit a contemporary portable computer 106, the docked portable computer 10 of the present invention achieves desktop performance equivalence.

It can be readily appreciated that other embodiments of the switching circuitry and the dock presence signal DP of the present invention may be used. Further, the present invention contemplates that the speeds of processing devices other than a CPU such as digital signal processors, coprocessors, and custom processors may also be improved by desktop performance equivalence.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A portable computer system operable at comparable performance levels to a desktop computer where docked at a docking station, comprising:
   a microprocessor operating at a first frequency when the portable computer system is not docked at the docking station and capable of operation at an increased frequency comparable to a desktop computer when enabled;
   a docking sensor for detecting when the portable computer system is docked at the docking station; and
   an enabling signal generator for enabling the microprocessor to operate at the increased frequency in response to the docking sensor.

2. The portable computer system of claim 1, further including:
   an onboard power supply for providing operating power to the microprocessor when the computer system is not docked at the docking station;
   a power supply inhibitor for disabling the onboard power supply in response to the docking sensor; and
   a power transfer connection for transferring power from the docking station to the microprocessor in response to the docking sensor.

3. The portable computer system of claim 2, wherein said onboard power supply comprises:
   a DC/DC converter for supplying a core voltage to said microprocessor and adjusting said core voltage responsive to the enabling signal generator, said DC/DC converter receiving a DC voltage from the docking station.

4. The portable computer system of claim 3, wherein said onboard power supply comprises:
   an AC/DC converter for supplying a DC voltage to said DC/DC converter in the absence of a docking condition.

5. The portable computer system of claim 1, said microprocessor having a clock level, wherein the clock level of said microprocessor is modulated in response to said enabling signal generator.

6. The portable computer system of claim 1, said microprocessor having an internal oscillator for generating the first frequency and the increased frequency, wherein said microprocessor is switched from the first frequency to the increased frequency by a bus frequency divider internal to said microprocessor in response to said enabling signal generator.

7. A portable computer system of claim 1, wherein the first frequency is generated by a first oscillator external to said microprocessor and the increased frequency is generated by another oscillator external to said microprocessor, said microprocessor switching from the first frequency to the increased frequency in response to said enabling signal generator.

8. The portable computer system of claim 1, further including
   a heat transfer mechanism for cooling the microprocessor; and
   a switch for activating the heat transfer mechanism in response to the docking sensor.

9. The computer system of claim 8, further including:
   an onboard power supply for providing operating power to the microprocessor when the computer system is not docked at the docking station;
   a power supply inhibitor for disabling the onboard power supply in response to the docking sensor; and
   a power transfer connection for transferring power from the docking station to the microprocessor in response to the docking sensor.

10. A portable computer system operable at comparable performance levels to a desktop computer when docked at a docking station, comprising:
    a microprocessor;
    an onboard power supply for providing operating power to the microprocessor when the portable computer system is not docked at the docking station;
    a docking sensor for detecting when the portable computer system is docked at the docking station;
    a power supply inhibitor for disabling the onboard power supply in response to the docking sensor;
    a power transfer connection for transferring power from the docking station to the microprocessor in response to the docking sensor; and
    an enabling signal generator for enabling the microprocessor to operate at an increased frequency in response to the docking sensor.

11. The portable computer system of claim 10, further including:
    a DC/DC converter for supplying a core voltage to said microprocessor and adjusting said core voltage responsive to the enabling signal generator for enabling the microprocessor to operate at the increased frequency in response to the docking sensor, said DC/DC converter receiving a DC voltage from the docking station in response to the docking sensor.

12. The portable computer system of claim 11, further including:
    an AC/DC converter for supplying a DC voltage to said DC/DC converter in the absence of a docking condition.

13. The portable computer system of claim 10, further including:
    a heat transfer mechanism for cooling the microprocessor; and
    a switch for activating the heat transfer mechanism in response to the docking sensor.

14. A portable computer system operable at comparable performance levels to a desktop computer when docked at a docking station, comprising:
    a microprocessor;
    a docking sensor for detecting when the portable computer is docked at the docking station;
    a heat transfer mechanism for cooling the microprocessor;
    a switch for activating the heat transfer mechanism in response to the docking sensor; and
    an enabling signal generator for enabling the microprocessor to operate at an increased frequency in response to the docking sensor.

15. A docking station capable of being coupled to a microprocessor based portable computer system to increase performance levels of the portable computer system when docked at the docking station, the portable computer system having an onboard power supply for providing a core voltage to a microprocessor of the portable computer system when the portable computer system is not docked to the docking station, comprising:
    a docking sensor for detecting when the portable computer system is docked at the docking station;
    an AC/DC converter providing power for transfer to the portable computer system in response to the docking sensor; and
    a DC/DC converter providing an increased core voltage to the microprocessor of the portable computer system in response to the docking sensor.

16. The docking station of claim 15, wherein the portable computer system has a heat transfer mechanism and the docking station further including:
    a cooling mechanism in said docking station for receiving heat from the heat transfer mechanism when the portable computer system is docked at the docking station.

17. The docking station of claim 16, wherein said cooling mechanism comprises:
    a fan; and
    an air conduit between said docking station and said portable computer system for forcing air from said fan into said portable computer system.

18. The docking system of claim 16, wherein said cooling mechanism comprises:
    a mechanical heat sink connection between said docking station and the portable computer system.

19. The docking system of claim 16, wherein said cooling mechanism comprises a fluid pump for pumping a cooling fluid into the portable computer system.

20. A method of improving the performance of a microprocessor in a portable computer system physically coupled to a docking station, the portable computer system having an AC/DC converter, a DC/DC converter, and a dock presence sensor for sensing when the docking station is physically coupled to the portable computer system and asserting a dock presence signal indicative of the physical coupling of the docking station to the portable computer system, the docking station having an AC/DC converter and a DC/DC converter, the microprocessor capable of operating at a first frequency with a first core voltage or a second frequency with a second core voltage, the second frequency being higher than the first frequency, the second core voltage being higher than the first core voltage, comprising the steps of:
    supplying a DC voltage by the AC/DC converter of the docking station to the DC/DC converter of the portable computer system when the dock presence signal is asserted;
    supplying the first core voltage by the DC/DC converter of said docking station to the microprocessor when the docking presence signal is asserted;
    switching said microprocessor from a first frequency to a second frequency when the dock presence signal is asserted;

supplying said DC voltage by the AC/DC converter of the portable computer system when the dock presence signal is deasserted; and supplying the second core voltage by the DC/DC converter of said portable computer system when the dock presence signal is deasserted; and switching said microprocessor from a second frequency to a first frequency when the dock presence signal is deasserted.

21. The method of claim 20, further comprising the steps of:

sensing when said docking station is physically coupled to said portable computer system; and asserting the dock presence signal indicative of the physical coupling of said docking station to said portable computer system.

22. The method of claim 20, said docking station having a cooling device, further comprising the step of:

cooling said microprocessor with the cooling device of said docking station.

23. A method of improving the performance of a microprocessor in a portable computer system physically coupled to a docking station, the portable computer system having a DC/DC converter and a dock presence sensor for sensing when the docking station is physically coupled to the portable computer system and asserting a dock presence signal indicative of the physical coupling of the docking station to the portable computer system, the docking station having an AC/DC converter and a DC/DC converter, the microprocessor capable of operating at a first frequency with a first core voltage or a second frequency with a second core voltage, the second frequency being higher than the first frequency, the second core voltage being higher than the first core voltage, comprising the steps of:

supplying the first core voltage by the DC/DC converter of said docking station to the microprocessor when the dock presence signal is asserted;

switching said microprocessor from a first frequency to a second frequency when the dock presence signal is asserted;

supplying a second core voltage by the DC/DC converter of said portable computer system when the dock presence signal is deasserted; and switching said microprocessor from a second frequency to a first frequency when the dock presence signal is deasserted.

24. The method of claim 23, further comprising the steps of:

sensing when said docking station is physically coupled to said portable computer system; and asserting a dock presence signal indicative of the physical coupling of said docking station to said portable computer system.

25. The method of claim 23, the docking station having a cooling device, further comprising the step of:

cooling said microprocessor with the cooling device of said docking station.

26. A docking station capable of being coupled to a portable computer system to increase performance levels of the portable computer system when docked at the docking station, the portable computer system including a docking sensor for detecting when the portable computer system is docked at the docking station, the portable computer system further including an onboard power supply for providing a core voltage to a microprocessor of the portable computer system if the docking sensor detects the portable computer is not docked at the docking station, comprising:

an AC/DC converter providing power for transfer to the portable computer system in response to the docking sensor; and a DC/DC converter providing an increased core voltage to the microprocessor of the portable computer system in response to the docking sensor.

27. A portable computer system operable at comparable performance levels to a desktop computer where docked at a docking station, the docking station including a docking sensor for detecting when the portable computer system is docked at the docking station, comprising:

a microprocessor operating at a frequency when the portable computer system is not docked at the docking station and capable of operation at an increased frequency comparable to a desktop computer when enabled; and an enabling signal generator for enabling the microprocessor to operate at the increased frequency in response to the docking sensor.

* * * * *